(12) United States Patent
Bendlin et al.

(10) Patent No.: US 11,664,840 B2
(45) Date of Patent: *May 30, 2023

(54) ULTRA-LOW-POWER MILLIMETER-WAVE TO BASEBAND RECEIVER MODULE FOR SCALABLE MASSIVE MIMO

(71) Applicants: AT&T Intellectual Property I, L.P., Atlanta, GA (US); University of Notre Dame du Lac, South Bend, IN (US)

(72) Inventors: Ralf Bendlin, Cedar Park, TX (US); Jonathan David Chisum, South Bend, IN (US); Nicholas Joseph Estes, South Bend, IN (US); Bertrand Martyn Hochwald, South Bend, IN (US); Aditya Chopra, Austin, TX (US)

(73) Assignees: UNIVERSITY OF NOTRE DAME DU LAC, South Bend, IN (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,323

(22) Filed: Feb. 25, 2022

(65) Prior Publication Data
US 2022/0182092 A1 Jun. 9, 2022

Related U.S. Application Data

(63) Continuation of application No. 16/988,103, filed on Aug. 7, 2020, now Pat. No. 11,296,742.

(51) Int. Cl.
*H04B 1/22* (2006.01)
*H04L 27/06* (2006.01)
(Continued)

(52) U.S. Cl.
CPC ............ *H04B 1/22* (2013.01); *H04B 7/0413* (2013.01); *H04B 7/08* (2013.01); *H04L 27/06* (2013.01)

(58) Field of Classification Search
CPC .......... H04B 1/22; H04B 7/0413; H04B 7/08; H04L 27/06
See application file for complete search history.

(56) References Cited

U.S. PATENT DOCUMENTS

| | | | |
|---|---|---|---|
| 8,767,657 B1 * | 7/2014 | Dehghan | H04L 25/03891 370/329 |
| 10,194,327 B1 * | 1/2019 | Khan | H04L 27/2626 |

(Continued)

OTHER PUBLICATIONS

Massive MIMO Systems for 5G and beyond Networks—Overview, Recent Trends, Challenges, and Future Research Direction; Sensors 2020, 20, 2753; doi:10.3390/s20102753; pp. 1-35.

(Continued)

*Primary Examiner* — Freshteh N Aghdam
(74) *Attorney, Agent, or Firm* — Guntin & Gust, PLC; Ralph Trementozzi

(57) ABSTRACT

Aspects of the subject disclosure may include, for example, receiving, by a first radio module at a first location, a wireless signal, to obtain a first received RF signal. The wireless signal includes information originating at a remote transmitter and conveyed via a wireless channel. An envelope of the first received RF signal is detected by the first radio module without requiring a local oscillator, to obtain a first baseband signal. The first baseband signal may be filtered and/or amplified, after which it is provided to a processor. The processor also obtains a second digital signal from a second radio module receiving the wireless signal at a second location and determines an estimate of the information originating at the remote transmitter according to the first and second signals. Other embodiments are disclosed.

20 Claims, 10 Drawing Sheets

(51) Int. Cl.
*H04B 7/08* (2006.01)
*H04B 7/0413* (2017.01)

(56) References Cited

U.S. PATENT DOCUMENTS

| | | | | |
|---|---|---|---|---|
| 2014/0085008 | A1* | 3/2014 | Cohen | H03F 3/245 |
| | | | | 330/297 |
| 2014/0087673 | A1* | 3/2014 | Mostov | H03F 1/565 |
| | | | | 455/78 |
| 2016/0103199 | A1* | 4/2016 | Rappaport | G01S 3/42 |
| | | | | 342/377 |
| 2017/0077877 | A1* | 3/2017 | Anderson | H03F 3/211 |
| 2022/0045705 | A1 | 2/2022 | Bendlin et al. | |

OTHER PUBLICATIONS

Bazrafkan, et al., On the Capacity of Massive MIMO With 1-Bit ADCs and DACs at the Receiver and at the Transmitter, arXiv:1911.04694v1 [cs.IT] Nov. 12, 2019, pp. 1-25.

Cao, Chen, "Low-resolution ADC receiver design, MIMO interference cancellation prototyping, and PHYsecrecy analysis." (2017). Electronic Theses and Dissertations. Paper 2697, pp. 1-122.

Gao, Kang et al., Beamforming with Multiple One-Bit Wireless Transceivers, arXiv:1802.04923v1 [cs.IT] Feb. 14, 2018; pp. 1-7.

Gao, Kang et al., Power-Performance Analysis of a Simple One-Bit Transceiver, Undated, pp. 1-10.

Granja, Angel et al., Ultra-Broadband W-Band Balanced Schottky Diode Envelope Detector for High-Data Rate Communication Systems; IEEE DOI: 10.1109/IRMMW-THz.2018.8510047; 2018; pp. 1-2.

Larsson, Erik G., Massive MIMO for Next Generation Wireless Systems; arXiv:1304.6690v3; Jan. 21, 2014, pp. 1-20.

Li, Yongzhi et al., Channel Estimation and Performance Analysis of One-Bit Massive MIMO Systems; IEEE Transactions on Signal Processing, vol. 65, No. 15, Aug. 1, 2017; pp. 1-15.

Raleigh, Gregory G. et al., Spatio-Temporal Coding for Wireless Communication; IEEE Transactions on Communications, vol. 46, No. 3, Mar. 1998; pp. 1-10.

Sarajlic, Muris et al., When are Low Resolution ADCs Energy Efficient in Massive MIMO?; Digital Object Identifier 10.1109/ACCESS.2017.2731420; Jul. 24, 2017; pp. 1-17.

Uzunkol, Mehmet, Low noise Millimeter-wave and THz Receivers, Imaging Arrays, Switches in Advanced CMOS and SiGe Processes; 2013; pp. 1-138.

Vandana, CH. et al., Spatial Multiplexing in Massive MIMO with QPSK; International Journal of Engineering and Advanced Technology (IJEAT); ISSN: 2249-8958, vol. 8 Issue-4, Apr. 2019; pp. 1-3.

* cited by examiner

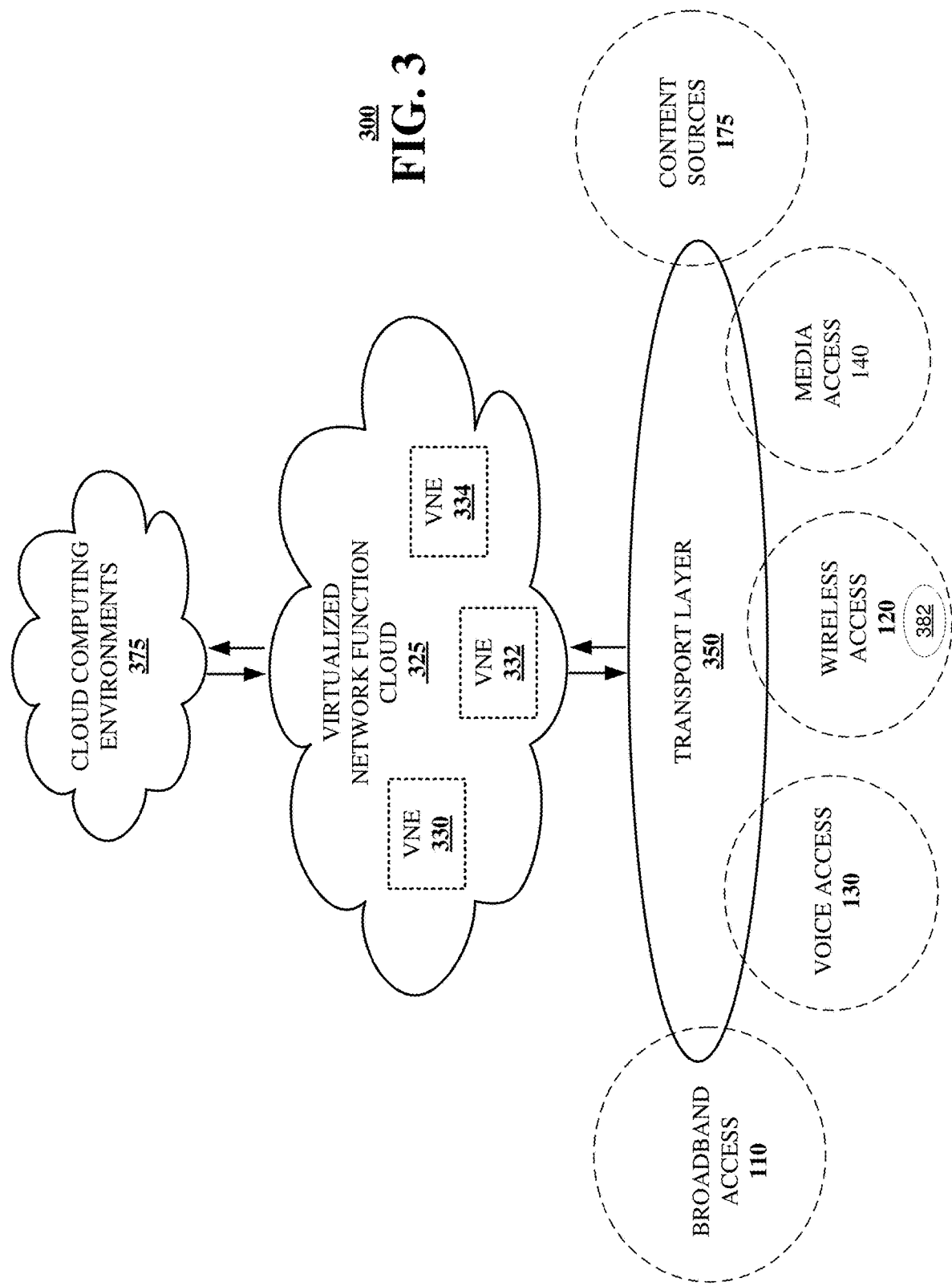

ULTRA-LOW-POWER MILLIMETER-WAVE TO BASEBAND RECEIVER MODULE FOR SCALABLE MASSIVE MIMO

CROSS REFERENCE TO RELATED APPLICATIONS

This application is a continuation of U.S. patent application Ser. No. 16/988,103 filed on Aug. 7, 2020. The contents of each of the foregoing is/are hereby incorporated by reference into this application as if set forth herein in full.

GOVERNMENT LICENSE RIGHTS

This invention was made with government support under ECCS1731056 awarded by the National Science Foundation. The government has certain rights in the invention.

FIELD OF THE DISCLOSURE

The subject disclosure relates to an ultra-low-power millimeter-wave to baseband receiver module for scalable massive MIMO.

BACKGROUND

The development of new wireless communications technologies has always been driven by the desire for higher data rates. In the case of commercial cellular, the rapid increase in the number of end-users of the past couple of decades demand a wireless communications solution that has low latency and high instantaneous data rate in a complicated physical environment with an unknown (a priori) number of users with unknown locations. One solution to increase data rates is to move to higher carrier frequencies (K-band and above), where traditional narrowband design leads to high absolute operating bandwidth. However, this move is not without cost: 5G NR marks a paradigm shift from omnidirectional to directive communications as higher-gain antennas are required to maintain a constant-power link as the carrier frequency increases. The requirement of high gain is a consequence of the Friis equation, which states that, for given antenna gain on transmit and receive, the receive power is inversely proportional to the square of the operating frequency. The current solution to this spatially-multiplexed paradigm is the phased array.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
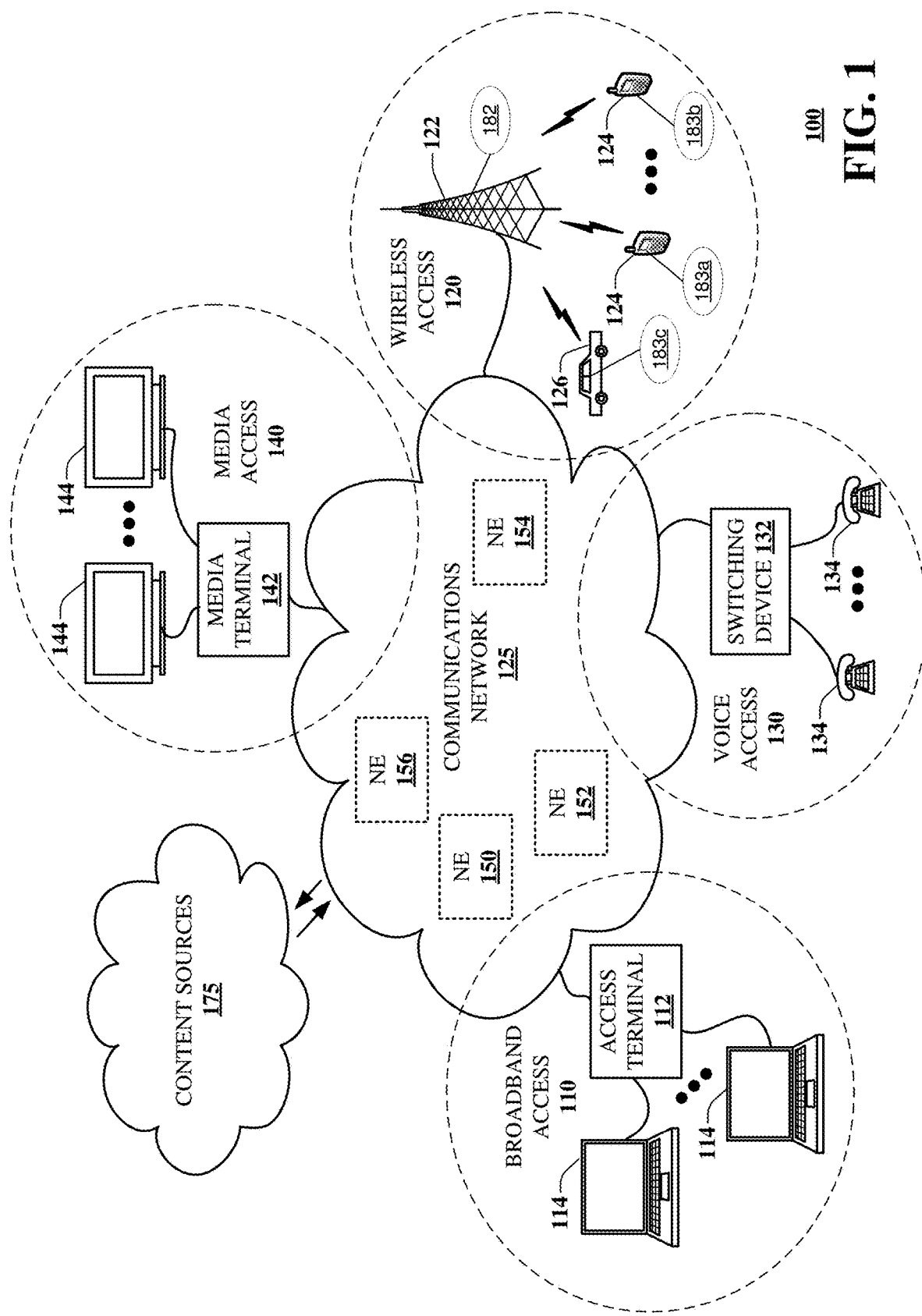
FIG. 1 is a block diagram illustrating an exemplary, non-limiting embodiment of a communications network in accordance with various aspects described herein.

The subject disclosure describes, among other things, illustrative embodiments for wireless communications systems in general, and to next-generation wireless communications systems with high-dimensional, low-resolution architectures for power-efficient wireless communications in particular. Other embodiments are described in the subject disclosure.

One or more aspects of the subject disclosure include a receiver device that includes an antenna element comprising an antenna terminal, wherein the antenna element is adapted to provide a received radio frequency (RF) signal at the antenna terminal responsive to illumination of the antenna element by a spatially diverse RF signal transmitted from a multiple input multiple output (MIMO) transmitter operating within a millimeter wave spectrum, wherein a baseband signal is impressed upon the spatially diverse RF signal by the MIMO transmitter according to amplitude modulation; A non-linear energy detector is communicatively coupled to the antenna terminal, wherein the non-linear energy detector is adapted to detect the baseband signal directly from the received RF signal without using a local oscillator, and an analog-to-digital converter (ADC) communicatively coupled to the antenna terminal, wherein the ADC is adapted to generate a digital signal according to the detected baseband signal. In at least some embodiments, the receiver device includes a baseband analog chain that may apply signal conditioning adapted to, e.g., amplify and/or filter and/or attenuate the detected baseband signal.

One or more aspects of the subject disclosure include a MIMO receiver that includes multiple radio modules, each adapted to provide a respective 1-bit output signal responsive to a wireless MIMO signal received by the multiple radio modules via a wireless channel. Each radio module of the multiple radio modules includes a respective antenna element that includes a respective antenna terminal. The respective antenna element is adapted to provide a respective received RF signal at the respective antenna terminal responsive to the wireless MIMO signal received via the wireless channel. Each radio module also includes a respective envelope detector communicatively coupled to the respective antenna terminal. The respective envelope detector is adapted to detect information modulated onto the wireless MIMO signal prior to transmission via the wireless channel, to obtain a respective detected baseband signal. Each radio module further includes a respective analog-to-digital converter (ADC) communicatively coupled to the respective envelope detector. The respective ADC is adapted to generate a respective digital signal according to the respective detected baseband signal. The MIMO receiver also includes a digital processor communicatively coupled to the multiple radio modules and adapted to determine an estimate of the information modulated onto the wireless MIMO signal prior to transmission according to the respective digital signal of each of the plurality of radio modules. In at least some embodiments, the receiver device includes a baseband analog chain that may amplify and/or filter the detected baseband signal.

One or more aspects of the subject disclosure include a process that includes receiving, by a first radio module and at a first location, a wireless MIMO signal, to obtain a first received radio frequency (RF) signal. The wireless MIMO signal includes information originating at a remote MIMO transmitter and conveyed to the first radio module via a wireless channel. An envelope of the first received RF signal is detected by the first radio module and without requiring a local oscillator, to obtain a first detected baseband signal. The first detected baseband signal is compared, by the first radio module, to a reference value to obtain a first digital signal according to the first detected baseband signal. The first digital signal is provided, by the first radio module, to a digital processor that also obtains a second digital signal from a second radio module also receiving the wireless MIMO signal at a second location. The digital processor determines an estimate of the information originating at the remote MIMO transmitter according to the first and second digital signals.

High-resolution, high peak-to-average-power communication modulation formats such as OFDM (LTE) require both the base station (BS) and user equipment (BE) to maintain a high degree of linearity. This linearity requirement limits the efficiency and indirectly the maximum practical power output of the transmitter and requires the use of mixing circuits with high power local oscillators on both transmit and receive. Linearity in gain stages and low noise amplifiers is also paramount. This ultimately results in a system with inefficient amplification and high-power requirements. In a massive MIMO deployment scenario, the power consumption of the transceiver system scales roughly linearly with the number of transmitter/receiver (Tx/Rx) elements, which can prove impractical for systems employing high peak-to-average power ratio modulations requiring traditional highly-linear design. This downside is further compounded in the phased array system, which employs high-resolution complex amplitude control, typically in the RF chain, to achieve beamforming at the expense of power consumption and efficiency.

The example embodiments disclosed herein use low-resolution, e.g., single-bit, transmitters and/or receivers and/or transceivers as means of relaxing the linearity and power requirements of next-generation wireless communications. An easily replicable, low power, low cost, RF-in, bits-out one-bit receiver cell forms the basic building block of a nonlinear MIMO cellular system. This transceiver architecture enables simple beamforming in the digital domain.

The devices, systems and techniques disclosed herein may be applicable to any wireless communications application but are particularly suitable for high-frequency cellular communications operating in K-band and above K-band, where the propagation characteristics of microwave and millimeter-wave signals, typically rely on high-gain antennas and encourage spatial multiplexing. The inherent spectral inefficiency of low-resolution modulation schemes becomes less of a concern when fewer end users are sharing identical space-bandwidth. Additionally, as the carrier frequency increases, solid-state amplifiers are less able to provide gain due to transistor parasitics, which result in a finite maximum operating frequency that increases complexity and power consumption for a given output power. At least one counterintuitive technique disclosed herein is to use transistor amplifiers in their most efficient nonlinear regime to reduce power consumption.

The illustrative examples provided herein include ultra-low-power, low-complexity, scalable MIMO radio cells. These radio cells exploit nonlinearities in their devices and/or circuits to obtain very low power consumption and ease of fabrication in a variety of technologies for wide bandwidths and at very high carrier frequencies. Such radio cell may include a receiver or a transmitter or receiver and transmitter. In at least some embodiments, the radio cell is configured to demodulate or to modulate or to modulate and demodulate a single bit per symbol. At least some of the illustrative example radio cells disclosed herein include energy detectors, such as envelope detectors and/or square law detectors that utilize detection directly from a received RF carrier, without requiring down-conversion and/or the use of mixers and/or local oscillators. Beneficially, such single-bit receivers and/or transmitters and/or transceivers relax linearity and power requirements of next-generation wireless communications. The simple radio cells disclosed herein are low power, low cost, easily replicable RF-in, bits-out, one-bit receivers that form basic building block of a nonlinear MIMO cellular system. This transceiver architecture enables simple beamforming in the digital domain.

Referring now to FIG. 1, a block diagram is shown illustrating an example, non-limiting embodiment of a communications network 100 in accordance with various aspects described herein. For example, communications network 100 can facilitate in whole or in part receiving, by a first radio module at a first location, a wireless MIMO signal, to obtain a first received RF signal. The wireless MIMO signal includes information originating at a remote MIMO transmitter and conveyed via a wireless channel. An envelope of the first received RF signal is detected by the first radio module without requiring a local oscillator, to obtain a first detected baseband signal. The first detected baseband signal is compared to a reference value to obtain a first digital signal that is provided to a digital processor. The digital processor also obtains a second digital signal from a second radio module receiving the wireless MIMO signal at a second location and determines an estimate of the information originating at the remote MIMO transmitter according to the first and second digital signals. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text, and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In at least some embodiments, the base station or access point 122 may be adapted to include a low-power MIMO radio 182 having an OOK transmitter, and/or an OOK receiver and/or an OOK transceiver according to the low-power, low-complexity radios and related devices disclosed herein. Likewise, in at least some embodiments, the mobile devices 124 and vehicle 126 may be adapted to include a low-power MIMO radio, 183a, 183b, 183c, generally 183, having an OOK transmitter, and/or an OOK receiver and/or an OOK transceiver according to the low-power, low-complexity radios and related devices disclosed herein.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
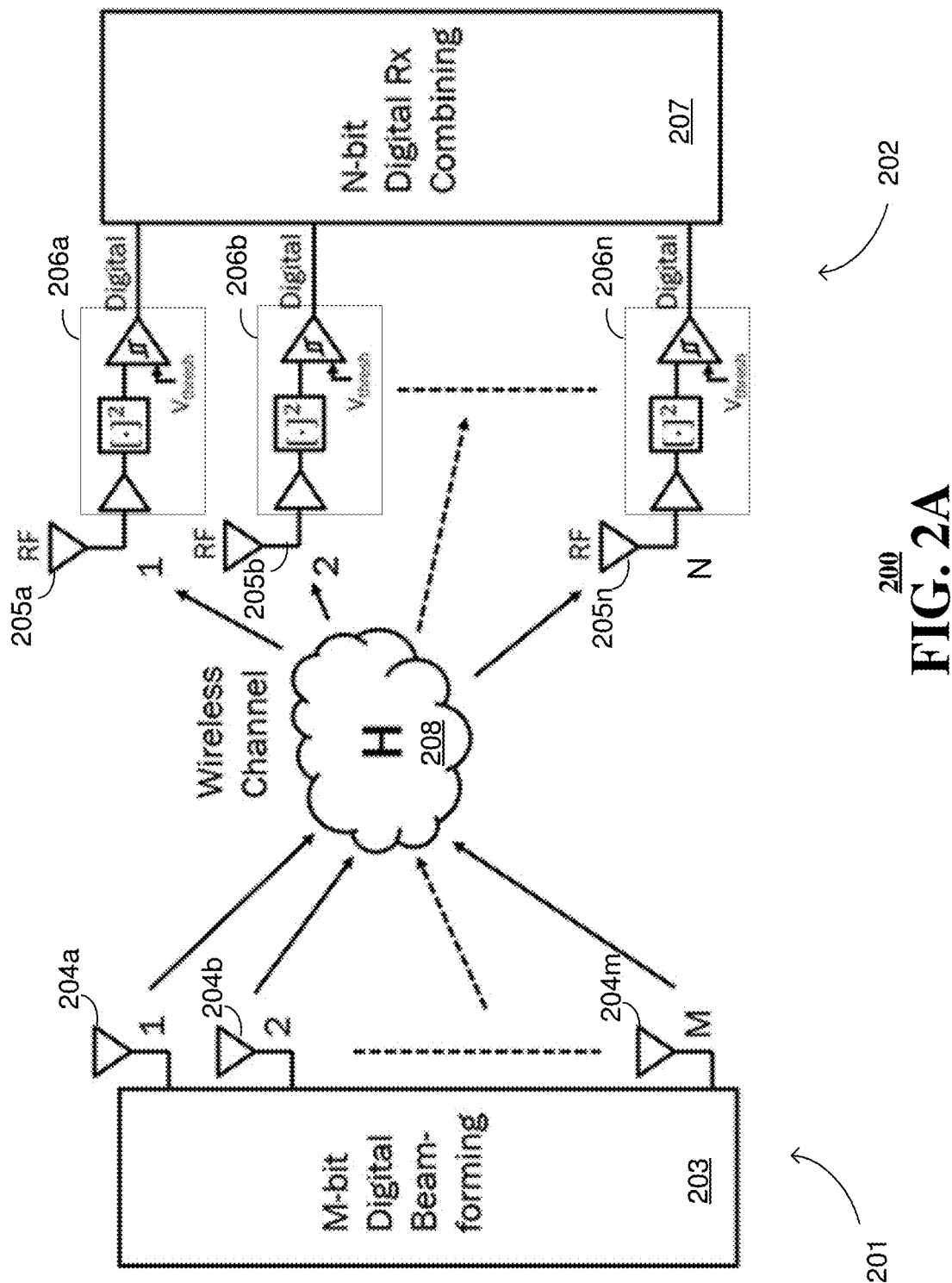
FIG. 2A is a block diagram illustrating an example, non-limiting embodiment of a MIMO communication system functioning within the communication network of FIG. 1 in accordance with various aspects described herein.

FIG. 2A is a block diagram illustrating an example, non-limiting embodiment of a MIMO communication system 200 functioning within the communication network of FIG. 1 in accordance with various aspects described herein. According to the illustrative example, the MIMO communication system 200 includes a transmitter portion 201 and a nonlinear receiver portion 202. The transmitter portion 201 includes an M-bit digital beamforming system 203 in communication with M antennas or radiating elements 204a, 204b, ..., 204M, generally 204. The receiver portion 202 includes N antennas 205a, 205b, ..., 205N, generally 205. Each of the antennas 205 is coupled to a respective radio receiver 206a, 206b, ..., 206N, generally 206, which are coupled, in turn, to an N-bit digital receiver processing system 207. Wireless communication signals propagate between the transmitter portion 201 and the receiver portion 202 via a wireless channel 208.

The example nonlinear receiver portion 202 uses an RF-in, bits-out approach that is well-suited for a low-cost, low-power solution to the scaling problem that arises in massive MIMO. The receiver portion 202 may include one or more highly efficient antenna-coupled nonlinear amplifiers and one or more detector elements, such as nonlinear rectifying elements, e.g., diodes, that facilitate a direct-to-baseband demodulator, sometimes referred to as an on-off-keying (OOK) demodulator. A baseband signal is obtained at an output of a detector element, without necessarily requiring any down conversion step. Baseband signals can be digitized, e.g., using a comparator that may be configured with a fixed and/or an adjustable threshold upon which comparisons are determined. It is understood that in at least some embodiments baseband processing may occur prior to digitization. For example, one or more of gain, filtering and/or attenuation may be applied to one or more of the baseband signals. Filtering may include passive filtering and/or active filtering. In a massive MIMO deployment, the digital outputs of each nonlinear receiver chain may be further processed in a digital domain to achieve an enhanced, and ideally a maximum channel capacity. In a full-rank channel, capacity saturates with the number of transmitters, assuming more receivers than transmitters, one-bit-per-transmitter as the signal to noise ratio increases. Consequently, more than one bit-per-channel use may be achieved as a number of transmitter and receiver chains increase; this is exemplified by the trivial case of M single-input-single-output (SISO) channels with one transmitter and one receiver, which can achieve M bits-per-channel use.

Although the illustrative examples disclosed herein refer to envelope detection or OOK, it is understood that other communication techniques may be used. For example, information may be impressed upon a transmitted RF according to a different modulation, such as phase shift keying (PSK). In such applications, the receivers disclosed herein may be adapted to perform detection to obtain baseband signals according to the type of modulation applied to the RF signal. Such applications may use well established techniques, such as differential PSK, energy thresholding or a combination thereof.

Figure 2B:
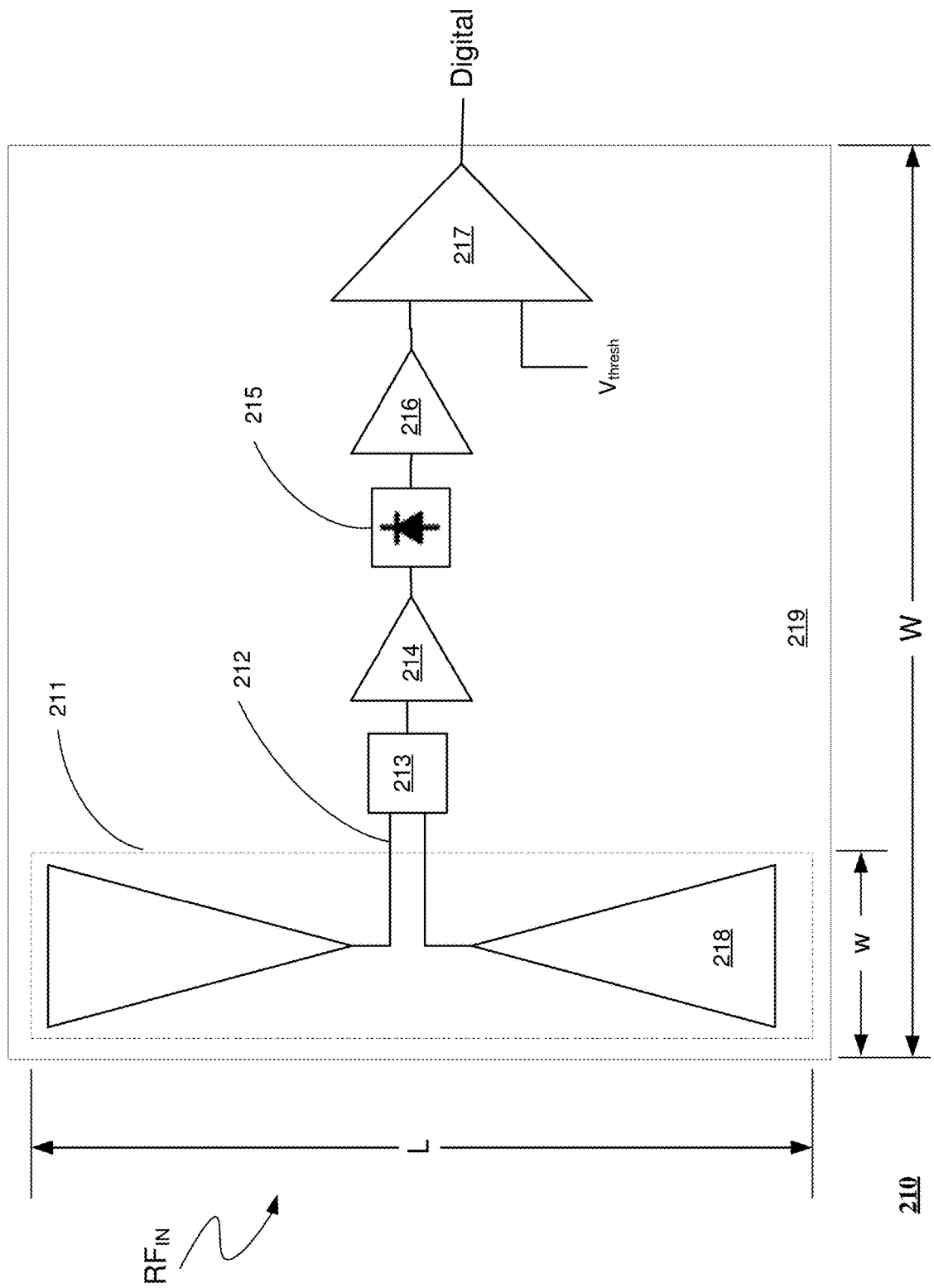
FIG. 2B is a block diagram illustrating an example, non-limiting embodiment of a MIMO radio functioning within the communication network of FIG. 1 and the MIMO communication system of FIG. 2A in accordance with various aspects described herein.

FIG. 2B is a block diagram illustrating an example, non-limiting embodiment of a MIMO radio module or cell 210 functioning within the communication network of FIG. 1 and the MIMO communication system of FIG. 2A in accordance with various aspects described herein. The example MIMO radio cell 210 includes at least one antenna 211 having a driving point, sometimes referred to as an antenna port or antenna terminal 212, an antenna coupler 213, an RF amplifier 214, a detector 215, a baseband amplifier 216, and a 1-bit ADC 217. It is understood that some embodiments may not require a separate antenna coupler 213. Alternatively or in addition, at least some embodiments may not require an amplifier 214. Depending on the desired degree of baseband analog processing, some embodiments may not require the baseband amplifier 216. For example, a minimal radio module may include an antenna, a detector and a 1-bit ADC, without necessarily requiring one or more of the antenna coupler 213 or the RF amplifier 214 and baseband amplifier 216.

Due to the very large bandwidths available in millimeter wave spectrum, digital-to-analog converters (DAC) and ADCs must work at very high sampling rates. Since their power consumption scales approximately linearly in the sampling rate and exponentially in the number of bits per sample, only very few data converters are employed in state-of-the-art systems and a base station with hundreds of antenna elements may only have a handful of data converters. Unlike fully analog beamforming systems, where phase and amplitude can individually be controlled per antenna element, limiting the number of data converters compromises robustness and mobility rendering millimeter wave spectrum less attractive for new use cases such as ultra-reliable low latency communications (URLLC).

Such simplified, or minimal complexity MIMO radio cells 210 offer several advantages. For example, a minimally complex module or cell may occupy a relatively small area of a MIMO receiver portion 202. Space savings may be advantageous for mobile device applications, e.g., for a mobile phone, a tablet, a PC, for appliance applications, such as smart TVs, and/or Internet of Things (IoT) devices, e.g., home appliances, printers, security system components, surveillance cameras, residential controllers, personal assistants, cloud-based voice service appliances, and the like. In the illustrative example, the dipole antenna 218 has a maximum dimension determined by its length, L. The example MIMO radio cell 210 occupies an area defined by the dipole antenna length L, and a module width, W. In at least some embodiments, the width W is less than the length L, i.e., W<L, such that an area occupied by the module is less than a square of the maximum antenna dimension, i.e., $A=L\times W \leq L^2$.

Dimensions of an antenna, such as the example dipole antenna 218, which happens to be a bowtie type of dipole antenna adapted to provide a relatively wide operational bandwidth, may be determined from an antenna calculator. For example, a length L may be determined according to: $L_-=0.75\lambda$. Likewise, a width w may be determined according to: $w=0.25\lambda$. For example, the MIMO radio cell 210 configured to operate in the Ka band, having a frequency between about 26.5-40 GHz, and a corresponding free-space wavelength between about 11.1 and 7.5 mm. Assuming operation at a center frequency of about 33 GHz, the free-space wavelength is about 9.1 mm, may have a length $L\approx6.8$ mm and a width $w\approx2.3$ mm. Accordingly, an area occupied by a Ka band MIMO radio may be less than about 7 mm×7 mm≈50 $mm^2$.

Other advantages of simplified, or minimal complexity MIMO radio cells 210 include relatively low power requirements and relatively low thermal load. According to the examples disclosed herein, the MIMO radio cells 210 use simple energy detectors, such as envelope detectors, or square law detectors. Such simple detectors may operate on the received RF signal directly without requiring any local operator and/or mixing to obtain an intermediate frequency between RF and baseband, as would be typical for millimeter wave digital communication systems. Rather the simple detectors may obtain a baseband signal directly from the RF signal according to an envelope of the RF signal. Moreover, the low-resolution, e.g., single-bit, ADC may be operated in a nonlinear region, e.g., using a simple comparator circuit, without requiring high-resolution, linear ADCs, as would be typical for millimeter wave digital communication systems. Still further, should signal amplification be used, e.g., providing an LNA between the antenna 218 and the detector, the LNA does not need to be operated in a linear region. As the low-resolution ADC relies upon a simple comparator circuit, linearity of the received signal does not need to be preserved. Accordingly, the amplifier, e.g., LNA, may be operated in a nonlinear region, e.g., in saturation. It is understood that operation of an amplifier, e.g., LNA, without regard to preserving linearity, e.g., in saturation, may be accomplished a substantially less power dissipation that would be required for linear operation. Likewise, operating the minimal complexity MIMO radio cell 210 requires relatively low power, certainly much less than traditional digital communication receivers operating in comparable wavelengths. Consumption of less power results in generation of less of a thermal load, e.g., according to component inefficiencies, power requirements and/or circuital resistive losses.

Beneficially, the factors contributing to smaller, simpler and cooler MIMO receiver modules also reduce initial costs as well as operational costs, e.g., lower power consumption and cooling. The reduced module size and reduced thermal load further allows more MIMO receiver modules to be used in the same space than would otherwise be possible with traditional MIMO receivers employing higher-resolution ADCs, and/or LNAs operating in their linear regions, digital receivers and/or detectors employing local oscillators, e.g., operating in a linear region. The reduced cost, thermal load and size permit larger numbers to be used within the same footprint, which is well adapted for massively MIMO systems. It is envisioned that massively MIMO systems may employ scores, if not hundreds, or even more MIMO receiver modules.

The example MIMO radio cell 210 includes a dipole antenna 218—in this instance, a bowtie antenna 218. It is understood that the antenna 211 may include a balanced structure, such as a dipole, an unbalanced structure, such as a monopole, and/or a patch. The antenna may be a resonant structure, such as the example dipole antenna 218, having a length L that approximates one-half of an operating wavelength ($\lambda$), i.e., $L\approx\lambda/2$. Without limitation, the antenna 211 may include an electric-field sensing element, a magnetic-field sensing element, or a combination of both an electric-field and a magnetic-field sensing elements. By way of non-limiting example, it is understood that antenna 211 may include a wire structure, such as a dipole, a monopole, or a loop. It is understood that a loop antenna 211 may be configured according to varying geometries, e.g., a circular loop, an elliptical loop, a square loop, and a rectangular loop. A wire structure antenna 211 may be free-standing, e.g., formed from a rigid conductor and/or formed on a substrate 219 and/or similar supporting structure. The antenna 211 may be substantially omnidirectional, such as the example dipole 218 structure. Alternatively or in addition, the antenna 211 may offer some directivity.

It is understood further that the antenna 211 may operate according to a preferred polarization, such as a linear polarization, a circular polarization, or more generally, an elliptical polarization. By way of example, the dipole antenna 218 may be replaced with a crossed dipole, in which two dipole antennas are positioned in an orthogonal arrangement and coupled to a common antenna terminal 212 via a phase shifting element, e.g., a 90-degree phase shifter. Still other antenna 211 may include antenna arrays, such as Yagi antenna arrays, log-periodic structures, spiral antennas and the like.

The antenna coupler 213 is positioned between the antenna terminal 212 and the detector 215. For embodiments, in which a gain element 214, such as an LNA is included, the antenna coupler 213 is positioned between the antenna terminal 212 and the gain element 214. In at least some embodiments, the antennal coupler 213 is positioned at the antenna terminal 212. The antenna coupler 213 may include a matching network, such as a conjugate matching network matching a driving point impedance of the antenna 211 to a characteristic impedance of a transmission line extending between the antenna coupler 213 and one or more of the gain element 214 and the detector 215.

Alternatively or in addition, the antenna coupler 213 includes a balun. The balun is adapted to facilitate a coupling of a balanced structure, such as the example dipole antenna 218 and an unbalanced structure, such as an unbalanced transmission line. Baluns can facilitate operation of a balanced device, such as the example dipole antenna 218 by promoting a substantially symmetric current distribution between each half of the dipole antenna 218. Baluns may include one or more of transmission lines, lumped elements, e.g., capacitors and/or inductors, including transmission line elements, e.g., $\lambda/4$ transmission line segments, and the like. In at least some embodiments, the balun structure may include a lossy element, such as a ferrite element and/or RF chokes adapted to absorb and/or otherwise prevent propagation of unbalanced currents.

In at least some embodiments, the MIMO radio cell 210 includes one or more filters. Filters may include, without limitation, high-pass filters, low-pass filters and band-pass filters. In at least some embodiments, filters may be analog filters, e.g., constructed according to lumped resistor and/or inductor and/or capacitor components. Alternatively or in addition, analog filters may utilize one or more waveguide segments, such as waveguide lengths, shorted waveguide stubs and/or open waveguide stubs positioned at predetermined lengths along a waveguide, and the like. One or more filters may be provided, for example, at one or more of the antenna terminal 212, the antenna coupler 213, an input of the LNA 214, and output of the LNA, an input of the detector 215 and/or at the output of the detector 215, and/or the output of a baseband processing stage, such as the example baseband amplifier 216. In some embodiments the filters may be high-pass filters adapted to block DC currents. Alternatively or in addition, the filters may be low-pass filters adapted to pass baseband currents.

The detector 215 may include any device having a non-linear characteristic curve, e.g., a non-linear current-voltage (I-V) curve. Examples include, without limitation, a diode, a transistor, e.g., a transistor wired in a diode configuration. In practical applications, parasitic values of the detector may be selected to ensure minimal signal degradation resulting from operation of the detector device at the frequencies of operation, e.g., at the RF the carrier frequency and/or the baseband frequency.

In some embodiments, the MIMO receive cell 210 may include a baseband amplifier 216 designed to amplify the baseband signal from the output of the envelope detector 215 to a suitable voltage/current/power level as required by comparator ADC 217. The amplifier 216 may also act as an impedance-transforming buffer stage between the enveloped detector 215 and comparator 217.

The comparator may include any suitable device to provide a stable binary output according to a comparison of an input baseband signal to a reference value. For example, the reference value may be a reference voltage. A value of the reference voltage may be selected to serve as a decision between a binary 1 or a binary 0. For example, if an expected voltage of a received baseband signal is expected to be 0 and 10 microvolts, a threshold value may be selected as ½ the maximum value, i.e., about 5 microvolts. In at least some embodiments, the threshold voltage is determined according to a minimum signal level, e.g., a system noise floor, in which a received voltage above a predetermined value above the noise floor may represent a binary 1. In some embodiments, the threshold value is fixed. Alternatively or in addition, the threshold value may be variable, e.g., according to signal conditions, noise, conditions, a calibration value, and so on. As an example, assume a simplified passive embodiment of receiver MIMO 210 that omits amplifiers 214 and 216. Further assume that the system is impedance matched and the noise seen at the comparator is solely due to thermal noise generated in the envelope detector. It is well-known that thermal noise in passive systems exhibits a flat spectral power density of −174 dBm/Hz. If the system bandwidth is 1 GHz, the corresponding noise power is −84 dBm. Suppose that the input power to the system is −50 dBm (for signal symbol 1) and the aggregate loss from antenna 218, filter 213, amplifier 214, and envelope detector 215 is 20 dB. This corresponds to an output power of approximately −70 dBm at the input comparator 217. Since the SNR is relatively high (14 dB), one-half the signal voltage at comparator 217 will approximately lie halfway between the noise floor voltage and signal on-state. From a voltage standpoint, halving the voltage reduces power by one-fourth, which corresponds to a threshold power of −76 dBm. Assuming a 50-Ohm input impedance, this corresponds to a threshold voltage of approximately 35 µV. In the event that the comparator hardware 217 is unable to detect voltage differences this low (because of, e.g. built-in hysteresis), it will be of benefit to instate baseband amplifier 216 to accommodate lower input power operation. One potential strategy for adjusting the threshold is feedback based on individual digital outputs, i.e. if the comparator 217 is outputting all binary 1's, the comparator threshold may be set too low and should be increased.

If a pre-amplifier at millimeter-wave is included, then the link budget would improve significantly due to the square-law device. That is, if the power incident upon the receive cell is −70 dBm and the millimeter-wave LNA gain is 30 dB, with a diode responsivity of 10 kV/W this corresponds to a 1 mV baseband output voltage. Even this is likely too low to pass along to a standard CMOS threshold detector which would have noise and hysteresis. Therefore a baseband voltage amplifier with e.g., 10V/V gain might be used. The baseband amplifier would have high input impedance (e.g., greater than the diode video resistance over the channel bandwidth of ~1 GHz, as an example). It would also have relatively low output resistance in order to pass a multi-GHz signal across the input capacitance of a CMOS threshold detector IC (perhaps 500 ohms output resistance or less).

Figure 2C:
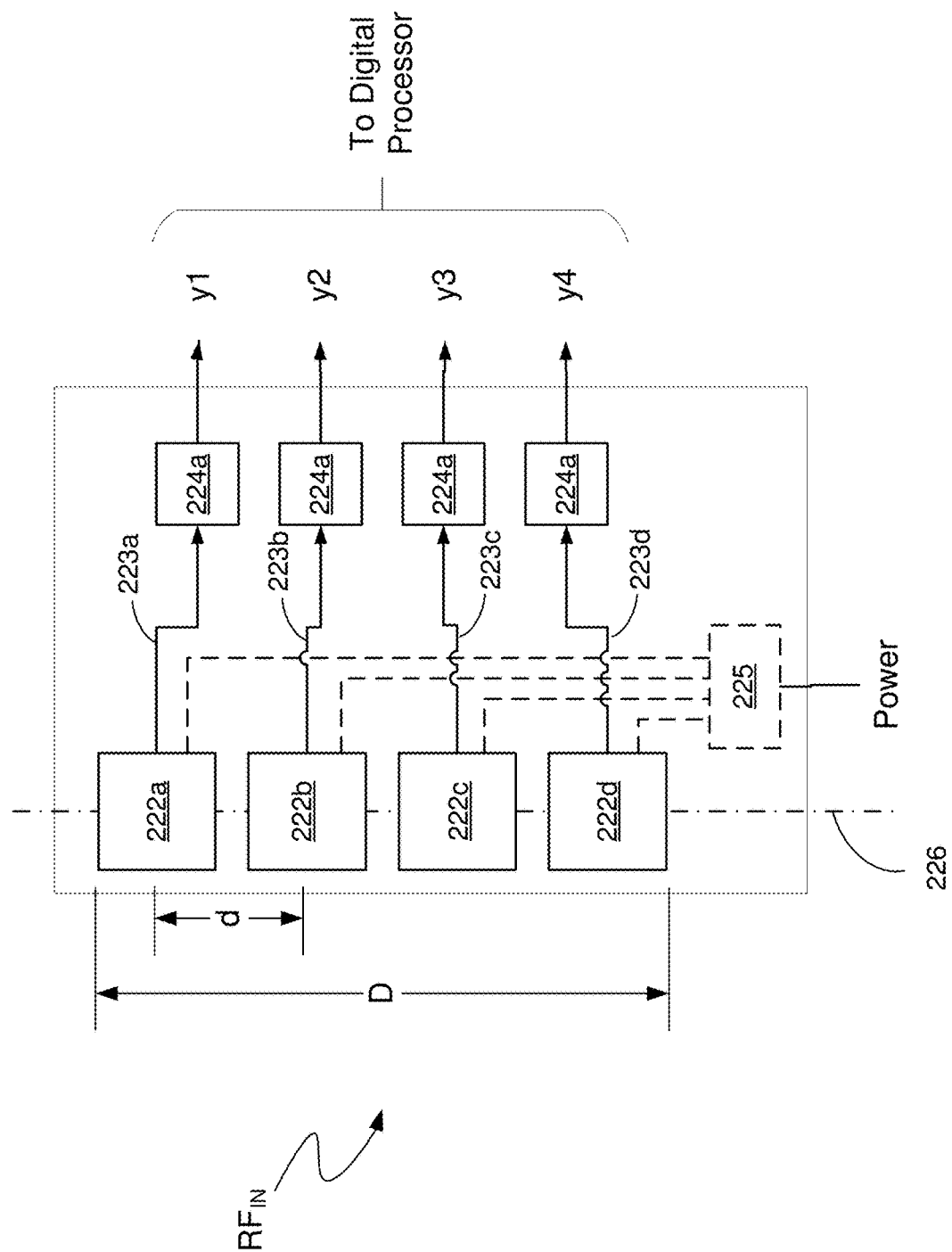
FIG. 2C is a block diagram illustrating an example, non-limiting embodiment of a MIMO radio module functioning within the communication network of FIG. 1 and the MIMO communication system of FIG. 2A in accordance with various aspects described herein.

FIG. 2C is a block diagram illustrating an example, non-limiting embodiment of a MIMO radio module 220 functioning within the communication network of FIG. 1 and the MIMO communication system of FIG. 2A in accordance with various aspects described herein. The example MIMO radio module 220 includes four MIMO radio cells, 222a, 222b, 222c, 222d, generally 222. Each of the cells 222 is coupled to a respective interconnect or terminal 224a, 224b, 224c, 224d, generally 224, via a respective transmission line 223a, 223b, 223c, 223d, generally 223. The terminals 224 may include an electrical interconnect adapted for repeated connections and disconnections, e.g., a connector, such as a coaxial connector, a push-pin connector, and the like. Alternatively or in addition the terminals 224 may include more permanent electrical interconnects, such as solder pads.

According to the illustrative example, a respective digital signal and/or digital values y1, y2, y3, y4 is available and/or otherwise accessible at each terminal 224 of the group of terminals 224. The digital signal and/or value y1, y2, y3, y4 may be equivalent to an output of the comparator 217 (FIG. 2B) of each cell 222. The digital signals/values y1, y2, y3, y4 are provided to a digital signal processor (not shown) for combination and/or digital processing. At least one example digital signal processor is the N-bit digital receiver processing system 207 (FIG. 2A).

The cells 222 may be identical cells, e.g., according to the example MIMO radio cell 210 (FIG. 2B). Alternatively, the cells 222 may differ, e.g., some cells 222 adapted for one portion of an RF spectrum, while other cells 222 are adapted for another portion of the RF spectrum. Alternatively or in addition, some cells 222 may be adapted for one polarization, e.g., linear horizontal, while other cells 222 are adapted for another polarization, e.g., linear vertical. Some cells 222 may be adapted to include LNAs 214, while other cells 222 may not. For example, those cells 222 without LNAs 214 may operate in a passive mode when signal conditions permit, e.g., relative strong received signal levels, relatively low interference and/or favorable channel conditions. Other cells 222 with the LNAs 214 may be selectively engaged and/or otherwise activated according to unfavorable signal conditions, e.g., relative weak received signal levels, relatively high interference and/or unfavorable channel conditions. Such different cells may be arranged on the same MIMO radio module 220, e.g., interspersed, and/or arranged in groups.

Alternatively or in addition different MIMO radio modules 220 may be combined within a common receiver portion 202 (FIG. 2A). For example, a first group of MIMO radio modules 220 may include passive detectors, e.g., without LNAs 214, while a second group of MIMO radio modules 220 may include active detectors, e.g., including LNAs 214. Other parameters, such as antennas, matching networks and/or filters, when provided, may differ within the same MIMO radio module 220 and/or according to the different groups of MIMO radio modules.

In at least some embodiments, one or more of the cells may include an active element, such as an LNA 214 (FIG. 2B) and/or a comparator 217 (FIG. 2B). In such instances, each of the cells 222 may require electrical power, e.g., according to one or more voltage levels. It is envisioned that in at least some embodiments, the electrical power, e.g., the one or more voltage levels may be provided by one or more power supplies 225 provided at the MIMO radio module 220. Alternatively or in addition, one or more voltage levels may be provided by a separate power source, such as a stand-alone power supply. In such configurations, the MIMO radio module 220 may include a power interconnect, e.g., a connector, adapted to interconnect to a remote power source. Conductors, e.g., traces, may be provided from contacts of a power connector to each of the cells 222.

According to the illustrative example, the MIMO radio cells 222, including antennas 211 (FIG. 2B), are spaced according to a center-to-center distance d. Depending upon a size and/or shape of the cells, there may be a separate distance between adjacent cells, as shown. However, it is envisioned that in at least some embodiments, the cells 222 may be adjacent to each other, such that there is no separation between adjacent cells 222. The cell spacing d may be uniform between all cells 222 of the module 220. Alternatively the cell spacing d may vary between at least some of the cells 222.

According to the illustrative example module, the cells 222 are arranged in a one-dimensional fashion, e.g., along a common linear axis 226. In some embodiments, the cells may be arranged in a two-dimensional fashion, e.g., according to a 2-dimensional (2D) pattern. The 2D pattern may be a regular pattern, in which spacings between adjacent cells 222 is uniform, e.g., constant in one or two dimensions. Example 2D patters include, without limitation, a rectangular grid, a hexagonal close pack grid, and the like. Such 3D patterns are beneficial at least in that they permit a greater number of cells 222 to be provided within a relatively compact receiver portion 202. It is envisioned that in at least some embodiments, the cells 222 may be arranged in a three-dimensional (3D) fashion, e.g., according to a conformal pattern that may conform to a 3D surface, such as a cube, a tetrahedron, a parallelepiped, a cone, or a curved surface, such as a spherical portion and/or an ellipsoidal portion.

Figure 2D:
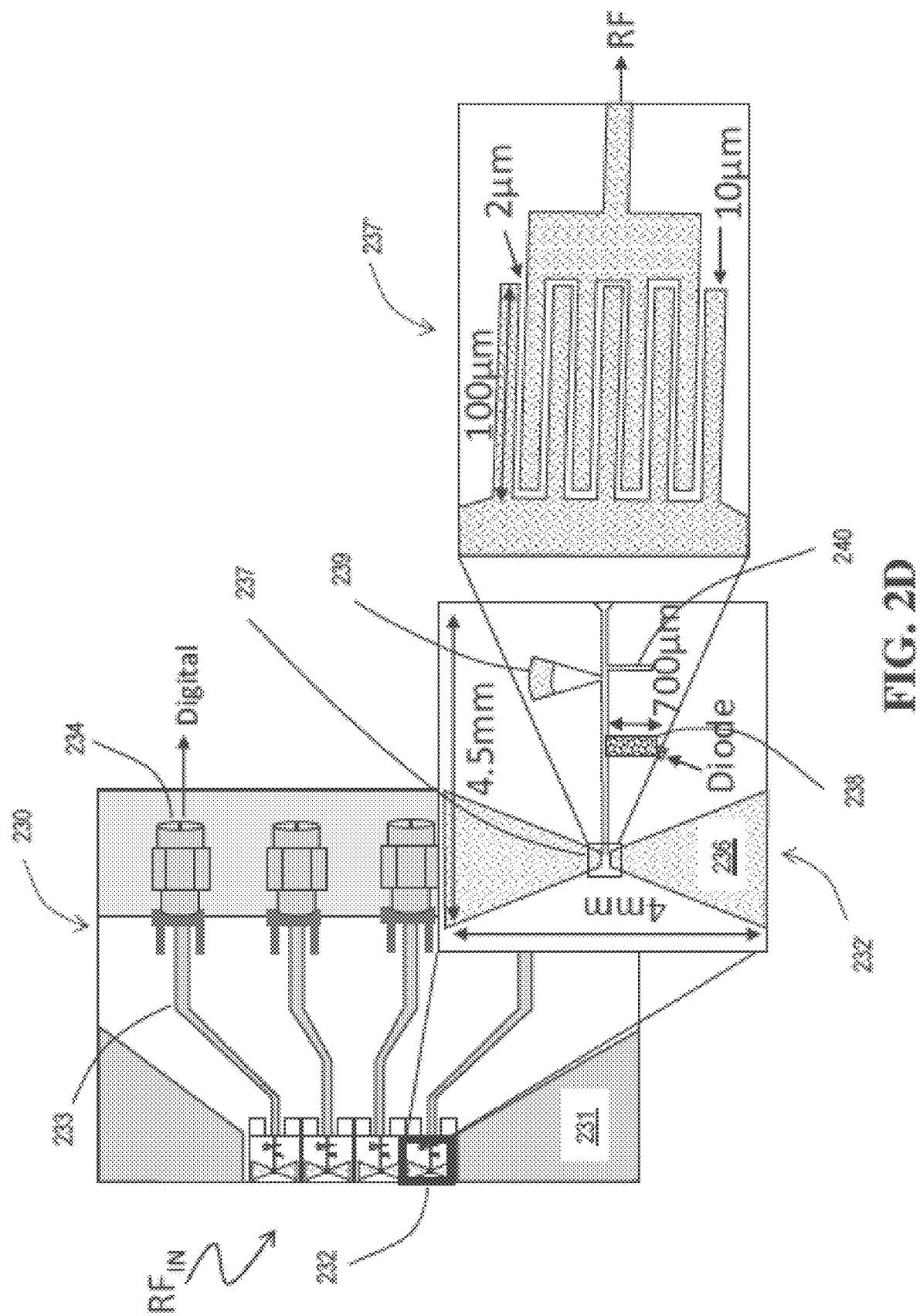
FIG. 2D is planar view of an example, non-limiting embodiment of a MIMO radio module functioning within the communication network of FIG. 1 and the MIMO communication system of FIG. 2A in accordance with various aspects described herein.

FIG. 2D is planar view of an example, non-limiting embodiment of an RF front end for a MIMO radio module 230, in this instance, a low-power, OOK receiver, functioning within the communication network 100 of FIG. 1 and the MIMO communication system 200 of FIG. 2A in accordance with various aspects described herein. The example MIMO radio module 230 includes a substrate 231 upon which the antenna cells and baseband distribution network are formed. The illustrative radio module 230 includes four radio cells 232, four connectors 234 and a baseband distribution network 233. Each radio cell 232 is in communication with a respective one of the connectors 234 via the RF distribution network 233. In operation, each radio cell 232 receives a wireless MIMO signal, detects bandpass information modulated onto the wireless MIMO signal at a remote MIMO transmitter, and generates a detected baseband signal representative of the modulated RF signal. The analog signal is passed to a signal combiner, which then passes to an ADC, e.g., a comparator, then in at least some embodiments to a digital processing unit (not shown) to determine an estimate of the transmitted information originating at the MIMO transmitter. This present example embodiment may be considered a limited implementation of the MIMO receiver 210, comprising an antenna 211, an antenna coupling/matching network 213 at antenna terminal 212, an RF LNA 214, and an envelope detector 215.

A first inset illustrates in more detail one of the MIMO radio cells 232'. The example MIMO radio cell 232 includes a bowtie dipole antenna 236, an antenna coupler 237, a diode energy detector 238, a first stub tuner 239 and a second stub tuner 240. The diode 238 is in electrical communication with the dipole antenna via the coupler 237. A more detailed illustration of the example antenna coupler is provided in a second inset 237'. The antenna coupler 237' includes a capacitive arrangement adapted to block a transfer of low frequencies, e.g., DC, between the dipole antenna 236 and the diode 238. The example capacitive coupler 237' includes an inter-digitated structure extending in length to about 100 μm, with each digit of the inter-digitated structure having a width of about 10 μm, and a separation from adjacent digits of about 2 μm. The antenna coupler configuration 237' ensures that received RF signals at the approximate operating frequencies, e.g., K-band, are passed from the antenna 236 to the diode 238 with minimal attenuation and/or distortion.

The diode 238 receives an RF signal responsive to exposure of the dipole antenna 236 to a wireless MIMO signal. Thus, the RF signal will depend upon the transmitted MIMO signal as adapted by a wireless RF channel between the remote transmitter and the dipole antenna 236. To at least some extent, the RF signal will depend on a position and/or orientation of the dipole antenna 236. Accordingly, it is expected that in at least some applications, RF signals obtained by the different MIMO radio cells 232 when exposed to the same wireless RF signal may differ according to channel variances. The diode is configured to rectify the received RF signal to obtain a representation of an amplitude or envelope of the received RF signal. The stub tuners 239 and/or 240 may facilitate impedance matching of the diode 238 to a transmission line and/or to other circuit elements, such as the low-resolution ADC or comparator (not shown). According to the illustrated example, the first stub tuner 239 presents an open circuit at a terminal of the diode 238, at the RF frequency, which aids in impedance matching at the RF frequency from the antenna 236 to the diode 238. The second stub tuner 240 presents a reactive impedance to twice the RF frequency at the terminal of diode 238, which prevents leakage of the second harmonic into the baseband distribution network 233.

The length of the dipole antenna 26 is about 4 mm. It is worth noting that the dimensions of the MIMO radio cell 232' is about 4 mm by about 4.5 mm. Namely, the dimensions of the cell 232' are substantially determined according to a size of the antenna resulting in an extremely compact form factor well adapted for positioning proximate to other such cells 232 in the example MIMO radio module 230.

The substrate 231 may include any suitable substrate that supports conductive elements, such as radiating elements, i.e., antennas, transmission lines, and the like. Examples include, without limitation, dielectric substrates including one or more of glass, fiberglass, plastics, polymers, and/or semiconductors, e.g., silicon. Further example substrates include bakelite or polyoxybenzylmethylenglycolanhydride, commonly used as an electrical insulator possessing considerable mechanical strength. Other alternatives include glass-reinforced epoxy laminate sheets, tubes, rods and printed circuit boards (PCB), such as FR-4. Still other alternatives include glass reinforced hydrocarbon/ceramic laminates materials, such as RO4003® Series High Frequency Circuit Materials, PTFE laminates and glass microfiber reinforced PTFE (polytetrafluoroethylene) composite materials, e.g., RT/Duroid® laminates, produced by Rogers Corporation.

The conductive elements, such as the antennas, matching networks, filters and/or the RF distribution networks may be configured upon the substrate 231. Such conductive elements may be defined by PCB fabrication processes including without limitation one or more of chemical etching, chemical deposition, semiconductor fabrication processes, or combination of both PCB and semiconductor fabrication processes. PCB fabrication processes include, without limitation imaging desired layout on conductor, e.g., copper, clad laminates, etching or removing excess copper from surface and/or inner layers to define and/or otherwise reveal traces and/or device mounting pads, creating a PCB layer stack-up by laminating, e.g., heating and pressing, board materials at high temperatures, and the like. PCB fabrication processes may include drilling holes for mounting holes, through hole pins and vias. Semiconductor fabrication processes may include one or more of a deposition that grows, coats, or otherwise transfers a material onto a substrate, e.g., a semiconductor wafer. Available technologies include, without limitation, physical vapor deposition, chemical vapor deposition, electrochemical deposition, molecular beam epitaxy and atomic layer deposition among others.

Low-resolution, receivers with 1-bit ADCs can be optimal in a bits/Joule-sense if the RF front-end is sufficiently low-power. The inherent nonlinearity of a 1-bit ADC permits the radio to be designed to satisfy power constraints without regard for linearity. As disclosed herein the RF front-end may be extremely low-power (even passive).

The example energy detector is configured to operate at about 38 GHz. The energy detector may incorporate a W-band zero-bias diode (ZBD), available from Virginia Diodes, in a 50-ohm co-planar waveguide (CPW) environment with 150 μm pitch pads. The CPW metal is 20 nm Ti, 480 nm Au deposited by an electron-beam evaporation liftoff process on 500-μm-thick high-resistivity ($\rho > 5$ k$\Omega \cdot$cm) silicon. A single-stub network matches the input to the ZBD, while two stubs at the output provide terminations at $fc$ (open) and $2fc$ (reactive). The diode is flip-chip soldered to the pads by hotplate using low-melting-point indium alloy solder balls. Gold wirebonds (diameter 25 μm) are used to equalize ground plane potential in the CPW, especially at stub junctions.

Figure 2E:
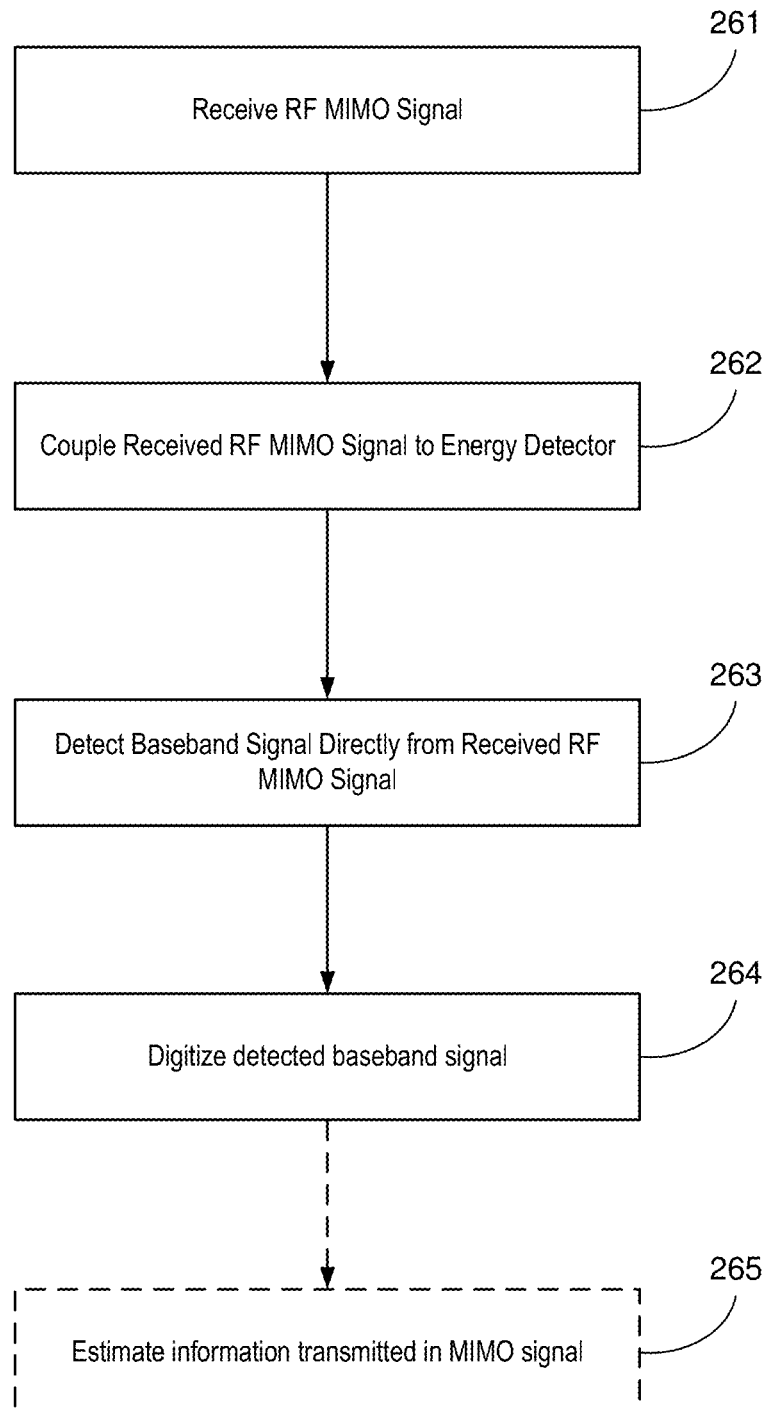
FIG. 2E depicts an illustrative embodiment of a MIMO communication process in accordance with various aspects described herein.

FIG. 2E depicts an illustrative embodiment of a MIMO communication process 260 in accordance with various aspects described herein. A spatially divers wireless signal is received at 261. The spatially divers signal may include a spatially multiplexed signal and/or spatially diverse signals resulting from multipath propagation between a transmitter portion 201 and a receiver portion 202 (FIG. 2A). In at least some embodiments, the spatially diverse wireless signal is obtained according to a MIMO process, such as those described in association with new radio and/or Next Generation Long Term Evolution LTE) wireless radio communications. In at least some embodiments, the receiving is accomplished using a transducer, such as an antenna element 211 (FIG. 2B) adapted to generate a received RF signal at an antenna terminal 212 (FIG. 2B) of the antenna 211 responsive to the spatially diverse wireless signal impingent upon the antenna element 211.

According to the example process 260, the received RF signal is coupled at 262 to an energy detector 215 (FIG. 2B). The coupling may be accomplished by an electrical conductor, e.g., a transmission line extending between the antenna terminal 212 and the detector 215. Alternatively or in addition, the coupling may include one or more of an antenna coupler 213 (FIG. 2B), a balun, a filter, and the like.

In at least some embodiments, the process 260 includes signal conditioning that includes an application of amplitude and/or gain. For example, the received RF signal is amplified, e.g., by an LNA 214 (FIG. 2B) before being applied to the detector 215. Other signal conditioning may include attenuating interference.

According to the example process 260, a baseband signal is detected at 263 from the received RF signal. For example, a detector 215 may be adapted to directly detect baseband information from the received RF signal, without requiring a down-conversion to an intermediate frequency and/or use of a local oscillator. For example, the detecting may detect an amplitude and/or an envelope of the received RF signal. In at least some embodiments, detection includes applying the received RF signal to a power detector. Alternatively or in addition detection includes applying the received RF signal to a square-law detector. In at least some embodiments, the detecting includes applying the received RF signal to an electrical device having a nonlinear I-V characteristic curve. In at least some embodiments the electrical device may be an active device, such as a transistor. Alternatively or in addition, the electrical device may be a passive device, such as a diode.

According to the example process 260, the detected signal is digitized at 264. A digitizing process may be accomplished using a low resolution, e.g., a single-bit ADC 217 (FIG. 2B). The ADC 217 may include a nonlinear process, such as a comparison of the detected signal to a reference, e.g., a threshold voltage. A value of a digital output of the ADC 217 is determined according to a result of the comparison to obtain a binary 1 or a binary 0, as the case may be.

In at least some embodiments, the example process 260 estimates at 265 information transmitted over a wireless channel 208 (FIG. 2A) via the spatially diverse wireless signal. In at least some embodiments, the estimation is obtained via digital signal processing of digital signals obtained from one or more MIMO radio cells 210 (FIG. 2B) or modules 220 (FIG. 2C). Digital signal processing may include, without limitation, a combining of digital signals obtained from at least some of the cells 222, and/or modules 230.

It is envisioned that beamforming may be applied at a spatial diversity transmitter, e.g., a MIMO transmitter. In particular, a massively MIMO signal may employ beamforming to direct MIMO signals to one or more particular spatially diverse receivers. In at least some embodiments, beamforming may be applied at the receiver, e.g., steering an antenna beam towards one or more directions of the spatially diverse signals. However, according to the various examples disclosed herein it is envisioned that the example MIMO receiver portions 202 (FIG. 2A), MIMO cells 222 and/or modules 220 (FIG. 2B) may operate without applying beamforming. Such a relaxation with respect to beamforming relaxes spacing and/or separation, and/or orientation of multiple antennas 211 (FIG. 2B). Likewise, such as relaxation of beamforming at the MIMO receiver portion 202 is consistent with the overall low-power, low-complexity architecture. Accordingly, phase control elements, such as phase shifters, delay lines, and the like are unnecessary at the receiver portion 202.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of the example systems 200, modules or devices 210, 220, 230, and example process 260 presented in FIGS. 1, 2A, 2B, 2C, 2D, 2E and 3. For example, virtualized communication network 300 can facilitate in whole or in part receiving, by a first radio module at a first location, a wireless MIMO signal, to obtain a first received RF signal. The wireless MIMO signal includes information originating at a remote MIMO transmitter and conveyed via a wireless channel. An envelope of the first received RF signal is detected by the first radio module without requiring a local oscillator, to obtain a first detected baseband signal. The first detected baseband signal is compared to a reference value to obtain a first digital signal that is provided to a digital processor. The digital processor also obtains a second digital signal from a second radio module receiving the wireless MIMO signal at a second location and determines an estimate of the information originating at the remote MIMO transmitter according to the first and second digital signals.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc., For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350. It is understood that in at least some embodiments, the wireless access 120 may be adapted to include a low-power MIMO radio 238 having an OOK transmitter, and/or an OOK receiver and/or an OOK transceiver according to the low-power, low-complexity radios and related devices disclosed herein.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
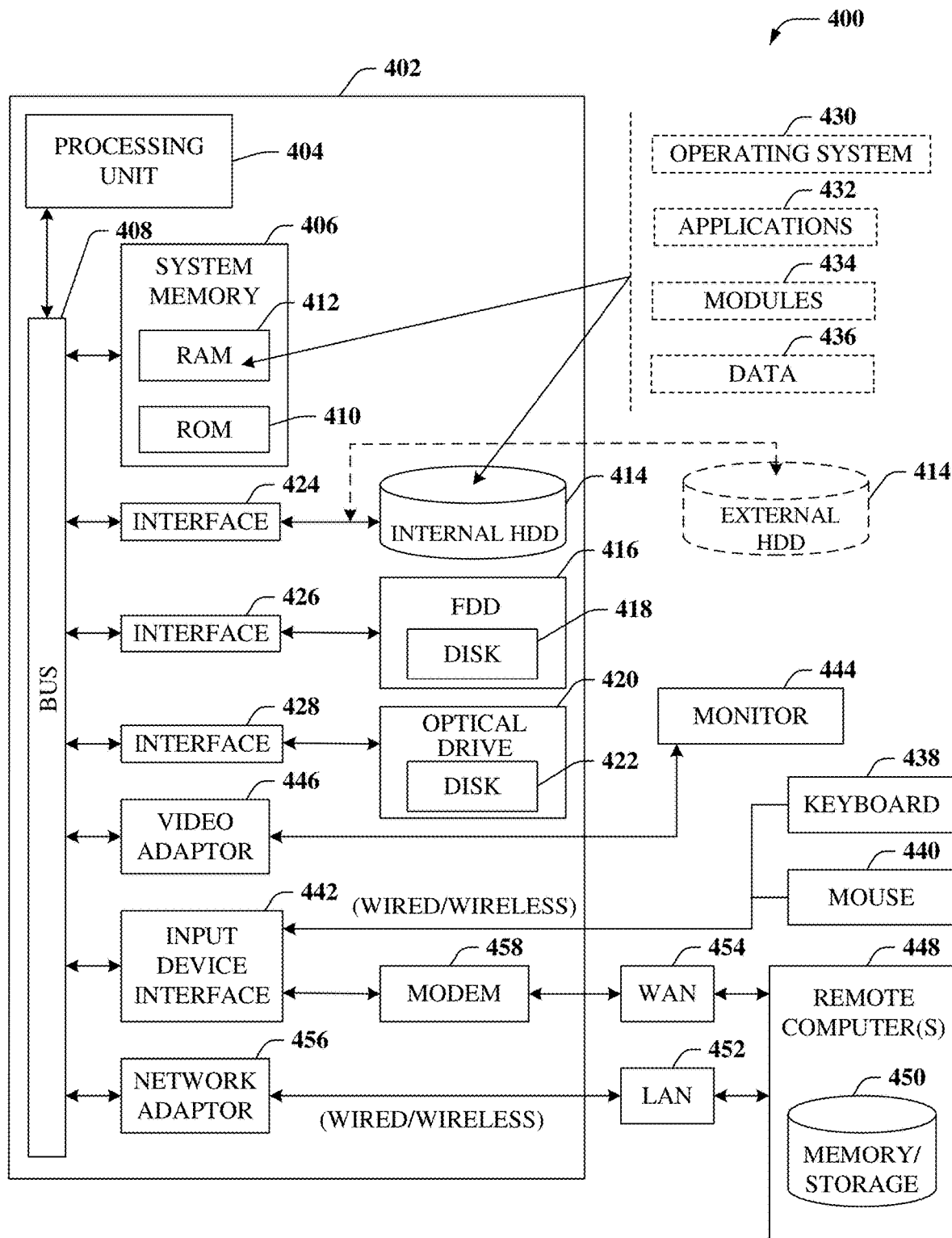
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving, by a first radio module at a first location, a wireless MIMO signal, to obtain a first received RF signal. The wireless MIMO signal includes information originating at a remote MIMO transmitter and conveyed via a wireless channel. An envelope of the first received RF signal is detected by the first radio module without requiring a local oscillator, to obtain a first detected baseband signal. The first detected baseband signal is compared to a reference value to obtain a first digital signal that is provided to a digital processor. The digital processor also obtains a second digital signal from a second radio module receiving the wireless MIMO signal at a second location and determines an estimate of the information originating at the remote MIMO transmitter according to the first and second digital signals.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
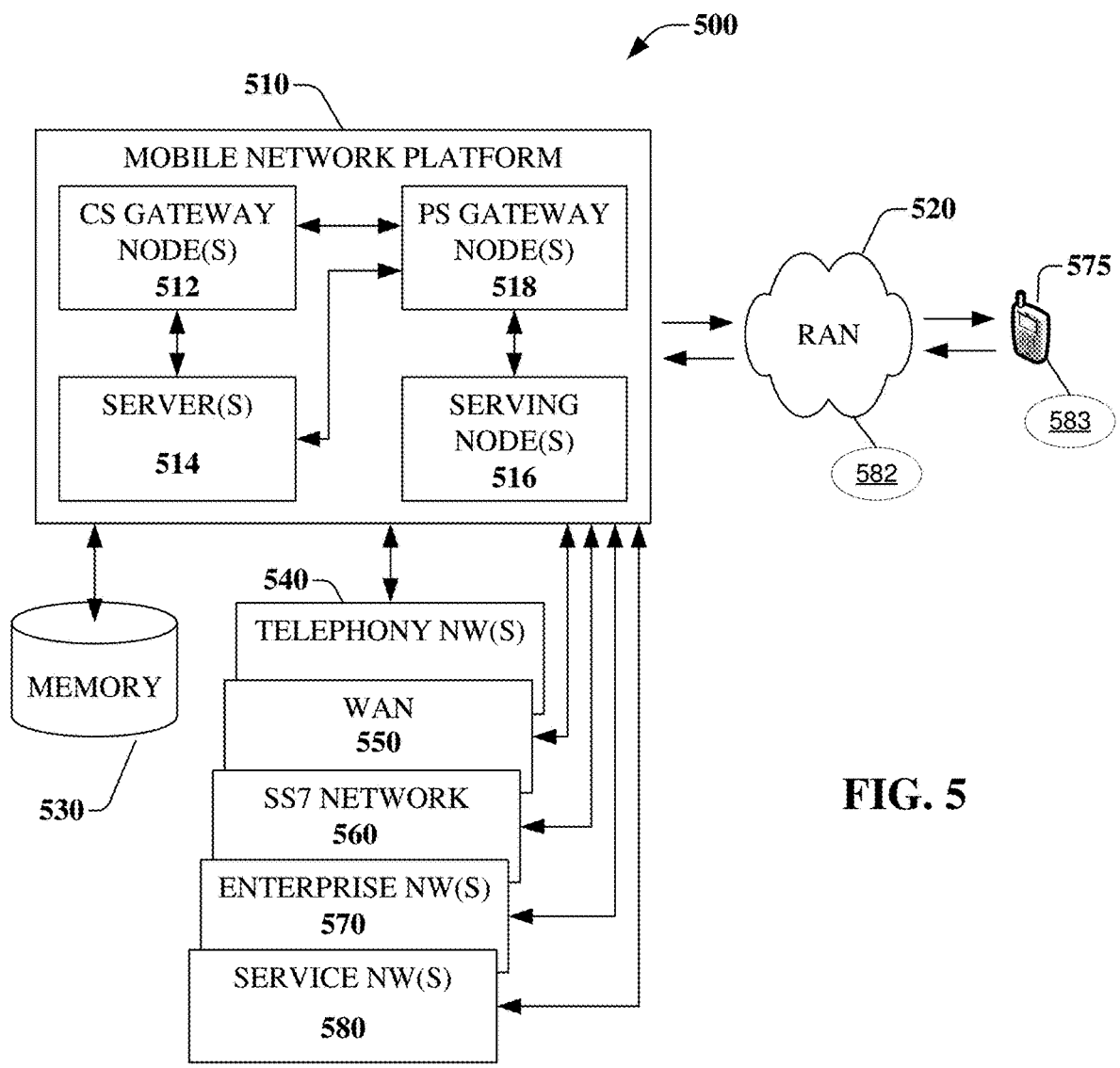
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving, by a first radio module at a first location, a wireless MIMO signal, to obtain a first received RF signal. The wireless MIMO signal includes information originating at a remote MIMO transmitter and conveyed via a wireless channel. An envelope of the first received RF signal is detected by the first radio module without requiring a local oscillator, to obtain a first detected baseband signal. The first detected baseband signal is compared to a reference value to obtain a first digital signal that is provided to a digital processor. The digital processor also obtains a second digital signal from a second radio module receiving the wireless MIMO signal at a second location and determines an estimate of the information originating at the remote MIMO transmitter according to the first and second digital signals. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

In at least some embodiments, the base station or access RAN 520 may be adapted to include a low-power MIMO radio 582 having an OOK transmitter, and/or an OOK receiver and/or an OOK transceiver according to the low-power, low-complexity radios and related devices disclosed herein. Likewise, in at least some embodiments, the mobile device 575 may be adapted to include a low-power MIMO radio 583 having an OOK transmitter, and/or an OOK receiver and/or an OOK transceiver according to the low-power, low-complexity radios and related devices disclosed herein.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
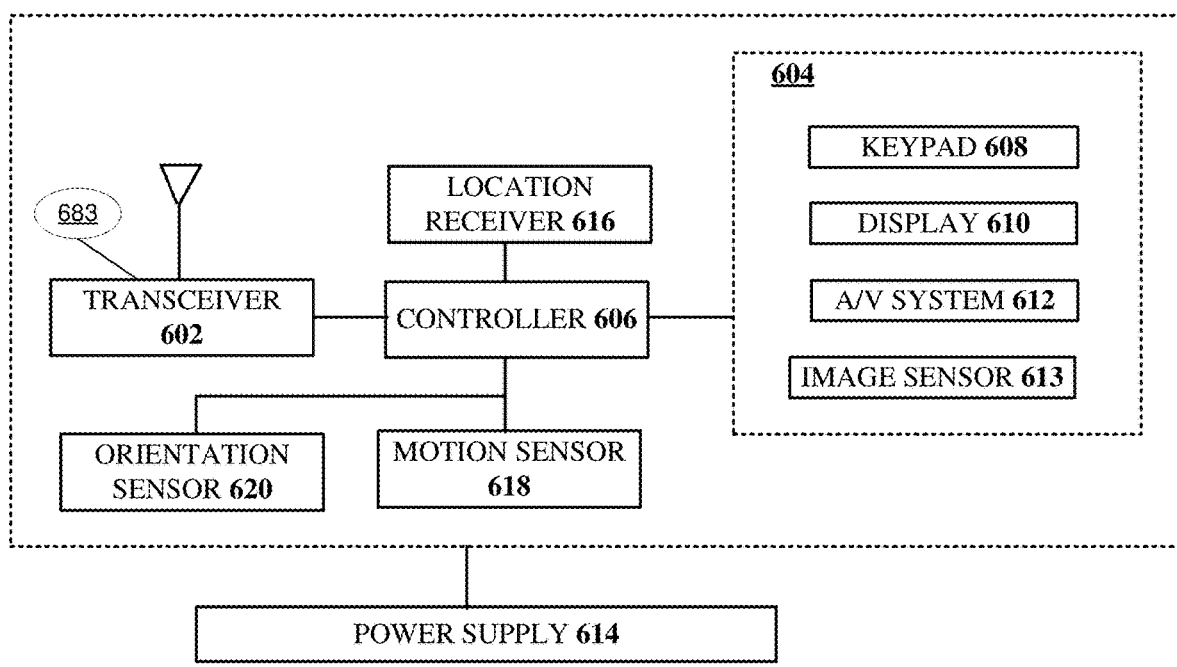
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving, by a first radio module at a first location, a wireless MIMO signal, to obtain a first received RF signal. The wireless MIMO signal includes information originating at a remote MIMO transmitter and conveyed via a wireless channel. An envelope of the first received RF signal is detected by the first radio module without requiring a local oscillator, to obtain a first detected baseband signal. The first detected baseband signal is compared to a reference value to obtain a first digital signal that is provided to a digital processor. The digital processor also obtains a second digital signal from a second radio module receiving the wireless MIMO signal at a second location and determines an estimate of the information originating at the remote MIMO transmitter according to the first and second digital signals.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600. In at least some embodiments, the transceiver 602 may be adapted to include a low-power MIMO radio 683 having an OOK transmitter, and/or an OOK receiver and/or an OOK transceiver according to the low-power, low-complexity radios and related devices disclosed herein.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

Although the example embodiments disclosed herein are directed to MIMO applications, it is understood that the disclosed techniques may be applied, without limitation, to other applications. For example, whereas MIMO systems may use multiple transmitters, it is understood that the receiver systems, devices, and/or techniques disclosed herein may be used to receive and/or otherwise process RF signals from a single transmitter. Likewise, the receiver systems, devices, and/or techniques disclosed herein may be used to receive and/or otherwise process RF signals from a multiple different transmitters, not necessarily within a MIMO context. It is conceivable that the receiver systems, devices, and/or techniques disclosed herein may be used to process RF signals received from remote transmitters and/or RF signals received from a nearby, or even collocated transmitter. The RF signals may be signals received via line of sight and/or signals received by way of one or more reflections, e.g., vial multipath and/or echo return as in a RADAR application.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A receiver device, comprising:
an antenna element comprising an antenna terminal, wherein the antenna element is adapted to provide a received radio frequency (RF) signal at the antenna terminal responsive to illumination of the antenna element by a spatially diverse RF signal comprising a baseband signal impressed thereon; and
a non-linear energy detector communicatively coupled to the antenna terminal, wherein the non-linear energy detector is adapted to detect a respective 1-bit baseband signal directly from the received RF signal without using a local oscillator to obtain a detected baseband signal.

2. The receiver device of claim 1, wherein the non-linear energy detector comprises a current-voltage (I-V) characteristic curve, the detected baseband signal determined according to the I-V characteristic curve.

3. The receiver device of claim 1, further comprising an analog-to-digital converter (ADC) communicatively coupled to the antenna terminal.

4. The receiver device of claim 3, wherein the ADC comprises a comparator adapted to compare the detected baseband signal to a reference value to obtain a comparison result, and wherein a digital signal is obtained according to the comparison result.

5. The receiver device of claim 4, wherein the baseband signal is impressed thereon according to amplitude modulation, and wherein the reference value comprises a threshold voltage, the digital signal being obtained according to a comparison of the detected baseband signal.

6. The receiver device of claim 1, wherein the receiver device is a passive device operating without requiring energy beyond that obtained via the illumination of the antenna element by the spatially diverse RF signal.

7. The receiver device of claim 1, wherein the spatially diverse RF signal comprises a signal transmitted from a multiple input multiple output (MIMO) transmitter, wherein a baseband signal is impressed upon the spatially diverse RF signal by the MIMO transmitter according to amplitude modulation.

8. The receiver device of claim 7, wherein the signal transmitted from the MIMO transmitter operates within a millimeter weave spectrum.

9. The receiver device of claim 1, wherein the received RF signal operates within a millimeter wave spectrum.

10. A radio frequency (RF) receiver system, comprising:
a plurality of radio modules, each adapted to provide a respective 1-bit output signal responsive to a wireless signal received by the plurality of radio modules via a wireless channel, each radio module comprising:
a respective antenna element comprising a respective antenna terminal, wherein the respective antenna element is adapted to provide a respective received RF signal at the respective antenna terminal responsive to the wireless signal received via the wireless channel;
a respective receiver circuit comprising a respective envelope detector communicatively coupled to the respective antenna terminal, wherein the respective envelope detector is adapted to detect information modulated onto the wireless signal prior to transmission via the wireless channel, to obtain a respective detected baseband signal; and
a processor communicatively coupled to the plurality of radio modules and adapted to determine an estimate of the information modulated onto the wireless signal prior to transmission according to the respective detected baseband signal of each of the plurality of radio modules.

11. The RF receiver system of claim 10, wherein a dimension of the respective receiver circuit is no larger than a maximum dimension of the respective antenna element, such that a size of each radio module is determined according to the maximum dimension of the respective antenna element.

12. The RF receiver system of claim 10, wherein the respective receiver circuit comprises a respective analog-to-digital converter (ADC) communicatively coupled to the respective envelope detector, wherein the respective ADC is adapted to generate a respective digital signal according to the respective detected baseband signal.

13. The RF receiver system of claim 10, wherein the wireless signal comprises a wireless multiple input multiple output (MIMO) signal.

14. The RF receiver system of claim 10, wherein the wireless signal comprises a millimeter wave signal, and wherein each respective receiver circuit comprises a respective LNA is configured to operate in saturation.

15. A method, comprising:
receiving, by a first radio module and at a first location, a wireless signal, to obtain a first received radio frequency (RF) signal, the wireless signal comprising information originating at a remote transmitter and conveyed to the first radio module via a wireless channel;
detecting, by the first radio module and without requiring a local oscillator, an envelope of the first received RF signal to obtain a first detected baseband signal; and
providing, by the first radio module, information obtained from the first detected baseband signal to a processor, the processor also obtaining a second detected baseband signal from a second radio module receiving the wireless signal at a second location, the processor determining an estimate of the information originating at the remote transmitter according to the first and second detected baseband signals.

16. The method of claim 15, wherein the detecting of the envelope of the first received RF signal further comprises rectifying, via a semiconductor junction, the first received RF signal.

17. The method of claim 15, further comprising conditioning, wherein the wireless signal comprises a multiple input multiple output (MIMO) signal comprising information originating at a remote MIMO transmitter.

18. The method of claim 15, further comprising:
comparing, by the first radio module, the first detected baseband signal to a reference value to obtain a first digital signal according to the first detected baseband signal, wherein the second detected baseband signal from the second radio module comprise a second digital signal, and wherein the estimate of the information originating at the remote transmitter is based on a combination of the first digital signal and the second digital signal.

19. The method of claim 15, wherein the wireless signal comprises a carrier wave component operating in a millimeter wave spectrum.

20. The method of claim 19, wherein the first received RF signal comprises an amplitude modulated signal according to the information impressed upon the carrier wave component according to on-off-keying applied by the remote transmitter.

* * * * *